US010286605B1

(12) United States Patent
Liang et al.

(10) Patent No.: US 10,286,605 B1
(45) Date of Patent: May 14, 2019

(54) IDENTIFIABLE INFORMATION FOR THREE-DIMENSIONAL ITEMS

(71) Applicant: Amazon Technologies, Inc., Seattle, WA (US)

(72) Inventors: Nancy Yi Liang, Seattle, WA (US); Aaron Takayanagi Barnet, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 662 days.

(21) Appl. No.: 14/853,771

(22) Filed: Sep. 14, 2015

(51) Int. Cl.
| B29C 64/386 | (2017.01) |
| G05B 19/4099 | (2006.01) |
| B29C 64/106 | (2017.01) |
| B33Y 10/00 | (2015.01) |
| B33Y 30/00 | (2015.01) |
| B33Y 50/02 | (2015.01) |

(52) U.S. Cl.
CPC .......... *B29C 64/386* (2017.08); *B29C 64/106* (2017.08); *G05B 19/4099* (2013.01); *B33Y 10/00* (2014.12); *B33Y 30/00* (2014.12); *B33Y 50/02* (2014.12); *G05B 2219/35134* (2013.01); *G05B 2219/49023* (2013.01)

(58) Field of Classification Search
CPC ............ B29C 67/0088; B29C 67/0055; G05B 19/4099; G05B 2219/49023; G05B 2219/35134; B33Y 50/02; B33Y 10/00; B33Y 30/00
USPC ........................................................... 700/98
See application file for complete search history.

(56) References Cited

U.S. PATENT DOCUMENTS

| 6,859,681 B1 * | 2/2005 | Alexander | G05B 19/4099 700/118 |
| 2015/0328839 A1 * | 11/2015 | Willis | G05B 19/4099 700/98 |
| 2016/0067927 A1 * | 3/2016 | Voris | B29C 67/0088 700/98 |
| 2018/0178453 A1 * | 6/2018 | Levine | G05B 15/02 |

* cited by examiner

*Primary Examiner* — Robert E Fennema
*Assistant Examiner* — Marzia T Monty
(74) *Attorney, Agent, or Firm* — Kilpatrick Townsend & Stockton LLP

(57) ABSTRACT

A three-dimensional item may be produced by a three-dimensional manufacturing apparatus to include a unique identifier. A set of three-dimensional manufacturing instructions may be generated, based at least in part on a three-dimensional model that represents the three-dimensional item and the unique identifier. The set of three-dimensional manufacturing instructions may be provided to the three-dimensional manufacturing apparatus to produce the three-dimensional item and the unique identifier.

20 Claims, 7 Drawing Sheets

IDENTIFIABLE INFORMATION FOR THREE-DIMENSIONAL ITEMS

BACKGROUND

Additive manufacturing enables manufacturers and, in some cases, hobby users to quickly and inexpensively produce three-dimensional items. Such three-dimensional items may be produced using job production, mass production, or batch production. Irrespective of the type of production, a particular three-dimensional item may be produced in almost any shape or geometry from a three-dimensional model or other electronic file representing the three-dimensional item.

BRIEF DESCRIPTION OF THE DRAWINGS

Various embodiments in accordance with the present disclosure will be described with reference to the drawings, in which.

DETAILED DESCRIPTION

Figure 1:
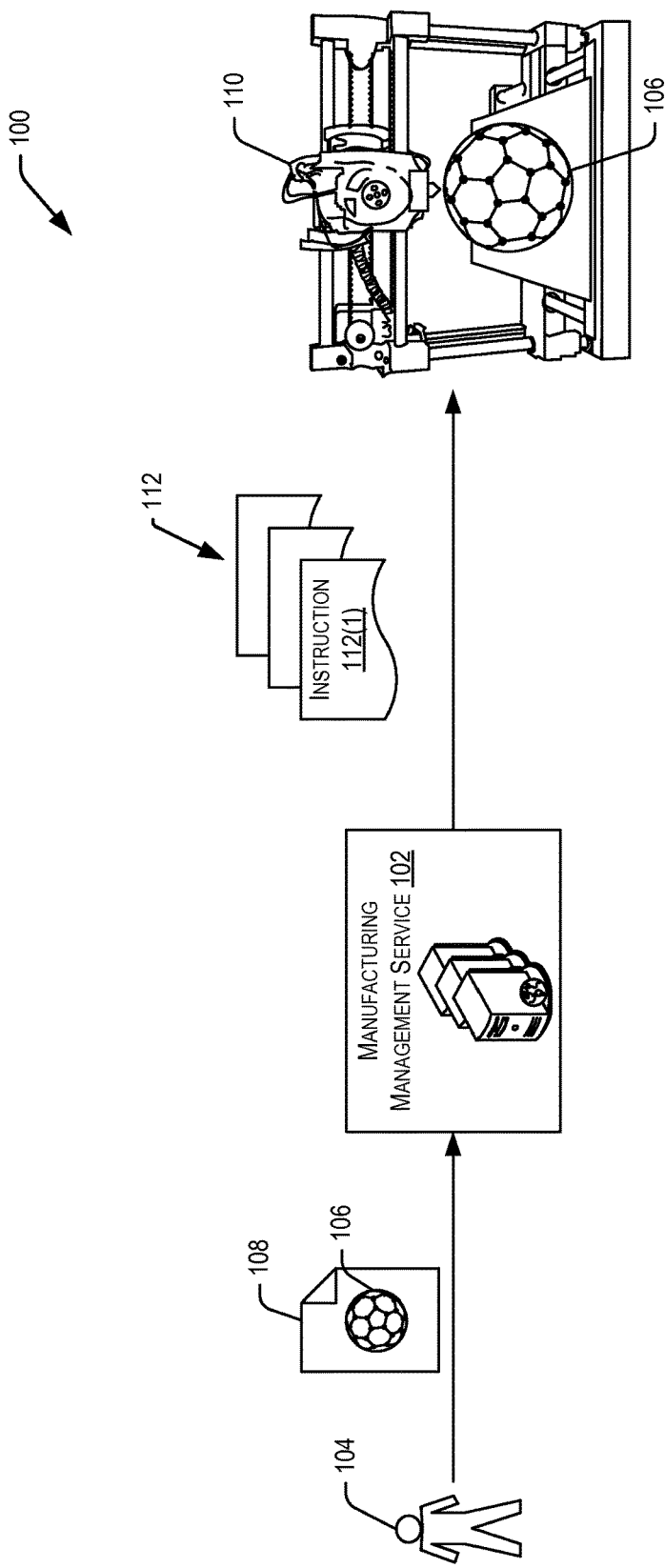
FIG. 1 is a schematic diagram illustrating an example system for generating instructions for producing three-dimensional items including identifiable information as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Embodiments herein are directed to techniques for generating instructions for the production of items that are manufactured on demand, such as by three-dimensional (3-D) printing, to include identifiable information. In particular, the instructions may instruct a three-dimensional printer to not only produce a three-dimensional item, but also to produce identifiable information on or within the three-dimensional item. The identifiable information may be encoded as an identifier that describes one or more aspects of the three-dimensional item (e.g., production information, designer information, copyright information, use information, etc.). In some examples, the identifiable information may include a unique identifier (e.g., watermark, serial number, or other identifier) that uniquely identifies the particular three-dimensional item. In some examples, the identifiable information may be a unique three-dimensional code (e.g., a pattern with three dimensions). In any event, the identifiable information may be attached to the three-dimensional item as part of manufacturing, may be the three-dimensional item on its own, or may be integrated into the construction of the three-dimensional item. In the latter example, a construction pattern (e.g., a seam, horizontal layers, or an infill) of a three-dimensional printer is adjusted such that the identifiable information is built into the three-dimensional item.

Regardless of how the identifiable information is produced, once associated with the three-dimensional item, the identifiable information may be used to identify the three-dimensional item and other aspects of the three-dimensional item at least during supplemental manufacturing steps. In some examples, the identifiable information may remain as part of the three-dimensional item after production. In this example, the identifiable information can be used to uniquely identify the three-dimensional item for purposes of shipping, quality control, customer service, or for any other suitable reason (e.g., recovery of stolen goods).

Turning now to a particular example, a designer may generate a three-dimensional model or other electronic file that represents a three-dimensional item. The three-dimensional model may be provided to a manufacturing management service. The manufacturing management service may use the three-dimensional model to create a set of three-dimensional manufacturing instructions that can be executed by a three-dimensional manufacturing apparatus (e.g., a three-dimensional printer) to produce the three-dimensional item represented by the three-dimensional model. As part of creating the three-dimensional manufacturing instructions, the manufacturing management service may analyze design characteristics of the three-dimensional model (e.g., size, shape, density, surface finish, strength, weight, etc.), any of which may be inherent to the three-dimensional model or provided as parameters by the designer or manufacturer. Based at least in part on the design characteristics, the manufacturing management service may identify a class of unique identifiers and a location on or within the three-dimensional item for placement or integration of a unique identifier from the identified class. For example, one class may include integrated identifiers and the location may be a vertical seam of the three-dimensional item. Based at least in part on this, the manufacturing management service may generate the three-dimensional manufacturing instructions to include instructions for integration of the unique identifier into the vertical seam. In order to integrate the unique identifier into the vertical seam, an extrusion head (e.g., a structure that includes a printing nozzle) of the three-dimensional printer may be instructed to offset its starting and stopping locations along the vertical seam according to some predetermined pattern. Once completed, the predetermined pattern may itself be the unique identifier used for uniquely identifying the three-dimensional item. In this manner, the three-dimensional item may be identified during the lifetime of the three-dimensional item whenever the unique identifier is read. The unique identifier may be read using any suitable imaging technique (e.g., radiography, image processing, machine vision, computer vision, etc.).

Turning now to the figures, FIG. 1 illustrates an example system 100 for implementing techniques relating to generating instructions for producing three-dimensional items including identifiable information as described herein. To this end, the system 100 may include a manufacturing management service 102. The manufacturing management service 102, as described in detail herein, may communicate with a designer 104 via a user device and a three-dimensional manufacturing apparatus 110. Using any suitable software running on the user device or otherwise, the designer 104 may design a three-dimensional item 106 and save the three-dimensional item 106 in association with a three-dimensional model 108. The three-dimensional item 106 may be any suitable object capable of being designed using design software and produced via three-dimensional printing. The three-dimensional model 108 may be any suitable electronic file (e.g., computer-aided drafting (CAD) file such as a STereoLithography file or .STL format) capable of storing a representation of the three-dimensional item 106.

In order to produce the three-dimensional item 106, a three-dimensional printer, such as the three-dimensional manufacturing apparatus 110, may be used. To this end, the designer 104 may provide the three-dimensional model 108 that represents the three-dimensional item 106 to the manufacturing management service 102. The manufacturing management service 102 may include one or more computing devices configured to process the three-dimensional model 108 and generate a set of three-dimensional manufacturing instructions 112 for later use by the three-dimensional manufacturing apparatus 110. In some examples, the three-dimensional manufacturing apparatus 110 may include one or more computing devices configured to process the three-dimensional model 108 and generate a set of three-dimensional manufacturing instructions 112. In some examples, the manufacturing management service 102 manages the operation of the three-dimensional manufacturing apparatus 110. In some examples, the manufacturing management service 102 may be associated with an electronic marketplace. For example, the manufacturing management service 102 may be operated by a manufacturing entity that manufactures three-dimensional items for customers of the electronic marketplace. In this example, the customers (e.g., the designer 104) may provide their three-dimensional models to the electronic marketplace and the electronic marketplace may facilitate their delivery to the manufacturing management service 102. The manufacturing entity may then manage fulfillment of the completed (printed) three-dimensional items to other customers (e.g. a purchaser of the three-dimensional item 106). In some examples, the manufacturing management service 102 is operated by the same entity that manages the electronic marketplace.

The three-dimensional manufacturing apparatus 110 may be any suitable additive manufacturing apparatus configured to perform any suitable manufacturing process. For example, the three-dimensional manufacturing apparatus 110 is illustrated as an extrusion deposition type of apparatus. Other suitable manufacturing apparatuses may be configured to perform processes including, for example, electron beam freeform fabrication, direct metal laser sintering, electron-beam melting, selective heat sintering, selective laser sintering, plaster-based three-dimensional printing, laminated object manufacturing, stereolithography, digital light processing, and any other suitable process.

The set of three-dimensional manufacturing instructions 112 may, when executed by a processor associated with three-dimensional manufacturing apparatus 110 (e.g., a processor within the three-dimensional manufacturing apparatus 110 or within a computer configured to control the three-dimensional manufacturing apparatus 110), instruct components of the three-dimensional manufacturing apparatus 110 (e.g., an extrusion head, a table, a feed controller, etc.) to perform various operations to produce the three-dimensional item 106. In some examples, the manufacturing management service 102 may include functionality similar to a "slicer" (e.g., a piece of software that converts a three-dimensional model into a series of thin layers and produces a numerical control file (e.g., "G" codes and "M" codes)). Thus, in some examples, the set of three-dimensional manufacturing instructions 112 is an example of a numerical control file. In some examples, the functionality of the manufacturing management service 102 and the software that controls the three-dimensional manufacturing apparatus 110 may be included in the same device or as part of the same service.

The set of three-dimensional manufacturing instructions 112 may also include at least one three-dimensional identifier manufacturing instruction 112(1). The three-dimensional identifier manufacturing instruction 112(1) may, when executed by the processor associated with the three-dimensional manufacturing apparatus 110, instruct the components of the three-dimensional manufacturing apparatus 110 to produce identifiable information to identify aspects of the three-dimensional item 106. In some examples, the identifiable information is produced without use of the three-dimensional identifier manufacturing instruction 112(1).

In some examples, the identifiable information may be added to the three-dimensional item 106 as determined by the manufacturing management service 102. For example, the identifiable information may be attached as a two-dimensional barcode or three-dimensional barcode or embossed or engraved on a portion of the three-dimensional item 106. The identifiable information may be recorded and used later to uniquely identify aspects of the three-dimensional item 106 in accordance with techniques described herein.

In some examples, the identifiable information may be integrated into the construction of the three-dimensional item 106 as determined by the manufacturing management service 102. For example, the identifiable information may be integrated into the three-dimensional item 106 as a unique infill pattern within a cavity of the three-dimensional item 106, as a unique pattern of starting and stopping locations along a vertical seam of the three-dimensional item 106, or as a unique pattern of horizontal layers of three-dimensional printing material along a surface of the three-dimensional item 106. The unique pattern and location of the pattern may be recorded and used later to uniquely identify aspects of the three-dimensional item 106 in accordance with techniques described herein.

In some examples, the identifiable information may be the three-dimensional item 106 itself. For example, the three-dimensional item 106 may be produced in a manner that enables the three-dimensional item 106 to be uniquely identifiable compared to other three-dimensional items produced from other models that are similar to the three-dimensional model 108 or from other models that are dissimilar to the three-dimensional model 108. The three-dimensional item 106 may be uniquely identifiable by comparing details of the particular three-dimensional model 108 used to generate the three-dimensional manufacturing instructions 112 with the three-dimensional item 106 post production. These details may include minor details (e.g., a corner that is not completely uniform in a cube, a stray piece of hair on a figurine, and the like) in the three-dimensional item 106 post production that can be similarly identified in the three-dimensional model 108. The minor details may be recorded and used later to uniquely identify aspects of the three-dimensional item 106 in accordance with techniques described herein.

In some examples, the three-dimensional item 106 may be identifiable even compared to other three-dimensional items 106 produced from the same three-dimensional model 108. This may be because the three-dimensional identifier manufacturing instruction 112(1) is determined in a manner that, when executed, will cause the three-dimensional manufacturing apparatus 110 to introduce minor variations into the construction of the three-dimensional item 106 that were not found in the three-dimensional model 108. These minor variations may be recorded and used later to identify aspects of the three-dimensional item 106 in accordance with techniques described herein.

In some examples, the identifiable information may include one or more identifiers that included certain information encoded therein. The identifiers may identify the three-dimensional item 106 and/or other aspects of the three-dimensional item 106. For example, the identifiers may include encoded metadata that identifies aspects of the design of the three-dimensional item 106 (e.g., identifies the designer 104, software used to design the three-dimensional model 108, a design date, a location where designed, etc.), aspects of the production of the three-dimensional item 106 (e.g., a three-dimensional manufacturing apparatus used for production, production date, production run, etc.), legal aspects of the three-dimensional item 106 (e.g., copyright registration information, reproduction authorization, ownership information, etc.), aspects of use of the three-dimensional item 106, and/or any other suitable aspect of the three-dimensional item 106.

In some examples, the identifiable information may be the same for at least some three-dimensional items 106 of a same category or group. For example, the identifiable information for certain three-dimensional items 106 produced during a particular production run or produced by the same manufacturing apparatus 110 may have the same identifiable information. Thus, the identifiable information may be used to uniquely identify aspects of the three-dimensional items 106 (e.g., the particular production run) instead of the three-dimensional items themselves. In some examples, the identifiable information may be used to uniquely identify each three-dimensional item 106. For example, a unique identifier may be entirely unique for a particular three-dimensional item 106. In some examples, the identifiable information may include some generic information (i.e., information shared among more than one three-dimensional item 106) and some particular information. For example, identifiable information for a batch of three-dimensional items 106 may include a portion of information that identifiers the designer, which may be the same for all items 106 in the batch, and a portion of information that uniquely identifies each three-dimensional item 106, which may be unique for each item 106 in the batch. In this manner, identifiable information may include characteristics that are similar to those of a Vehicle Identification Number (VIN), i.e., a code that includes generic information and particular information that in combination can be used to uniquely identify the three-dimensional item 106. In some examples, the identifiable information includes only particular information to uniquely identify the three-dimensional item 106.

Figure 2:
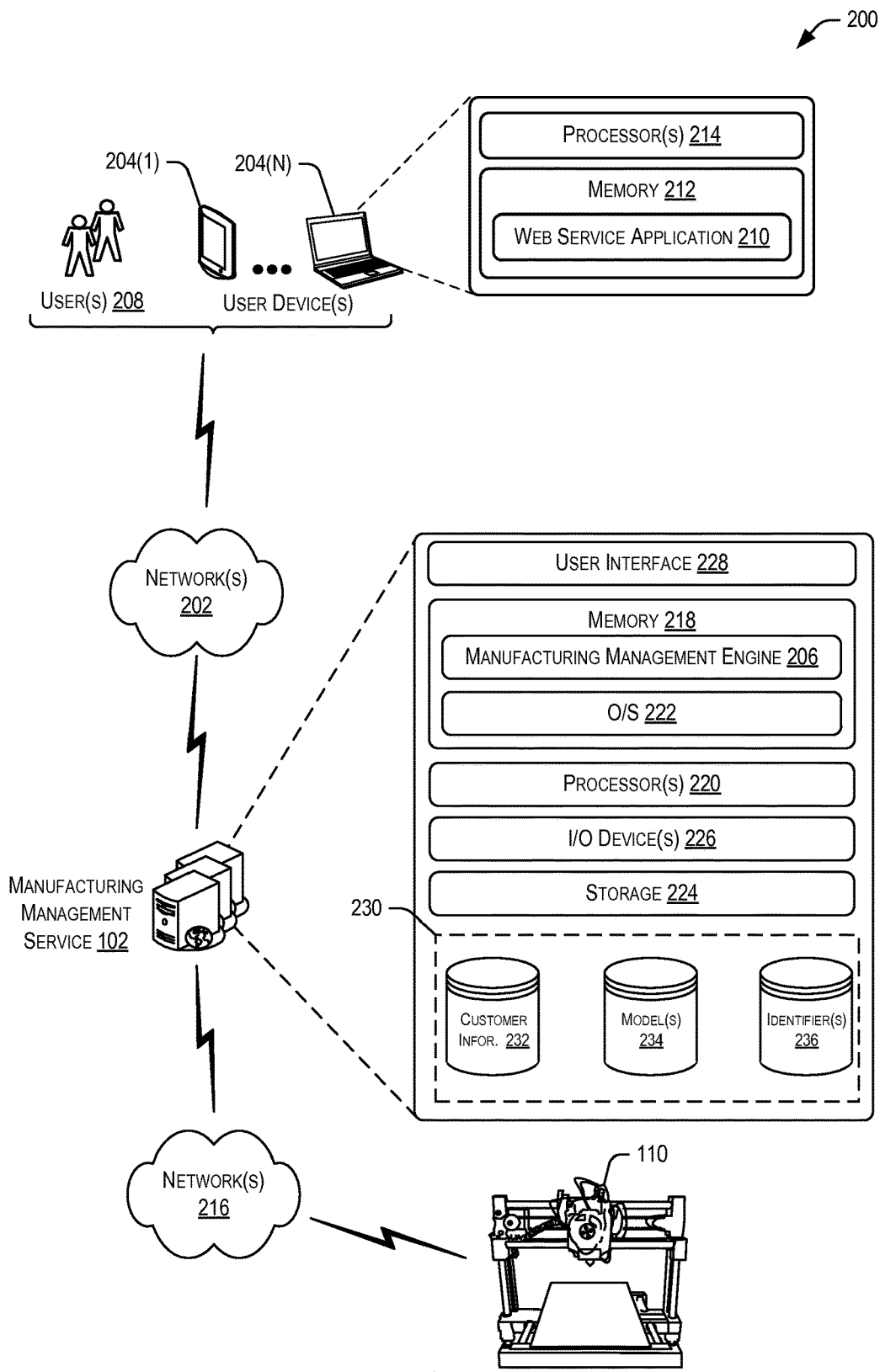
FIG. 2 is an example schematic architecture for implementing techniques relating to generating instructions for producing three-dimensional items including identifiable information as described herein, according to at least one example.

FIG. 2 illustrates an example architecture 200 for implementing techniques relating to generating instructions for producing three-dimensional items including identifiable information as described herein. The architecture 200 may include the manufacturing management service 102 in communication with one or more user devices 204(1)-204(N) (hereinafter, "the user device 204") via one or more networks 202 (hereinafter, "the network 202"). The user device 204 may be operable by one or more users 208 (hereinafter, "the user 208") to interact with the manufacturing management service 102. The network 202 may include any one or a combination of many different types of networks, such as cable networks, the Internet, wireless networks, cellular networks, and other private and/or public networks. The user 208 may be any suitable user including, for example, designers (e.g., the designer 104), customers of an electronic marketplace that is associated with the manufacturing management service 102, or any other suitable user.

The architecture 200 may also include the three-dimensional manufacturing apparatus 110 in communication with at least the manufacturing management service 102 via a secondary network 216. The secondary network 216 may include any one or a combination of many different types of networks, such as cable networks, the Internet, wireless networks, cellular networks, and other private and/or public networks. In some examples, the secondary network 216 may also include hard-wired connection between the manufacturing management service 102 and the three-dimensional manufacturing apparatus 110. In any event, instructions may be sent from the manufacturing management service 102 via the secondary network 216 to the three-dimensional manufacturing apparatus 110. In some examples, the three-dimensional manufacturing apparatus 110 sends information in the form of feedback to the manufacturing management service 102 via the secondary network 216 or otherwise (e.g., by writing to a disk and transferring). In some examples, the three-dimensional manufacturing apparatus 110 also communicates via the network 202.

Turning now to the details of the user device 204, the user device 204 may be any suitable type of computing device such as, but not limited to, a digital camera, a wearable device, a tablet, a mobile phone, a smart phone, a personal digital assistant (PDA), a laptop computer, a desktop computer, a thin-client device, a tablet computer, a set-top box, or any other suitable device capable of communicating with the manufacturing management service 102 via the network 202 or any other suitable network. For example, the user device 204(1) is illustrated as an example of a smart phone, while the user device 204(N) is illustrated as an example of a laptop computer.

The user device 204 may include a web service application 210 within memory 212.

Within the memory 212 of the user device 204 may be stored program instructions that are loadable and executable on processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The web service application 210, stored in the memory 212, may allow the user 208 to interact with the manufacturing management service 102 via the network 202. Such interactions may include, for example, sending one or more files including three-dimensional models and instructions for producing three-dimensional items, placing orders for items advertised on an electronic marketplace associated with the manufacturing management service 102, and any other suitable client-server interactions. The manufacturing management service 102, whether associated with the electronic marketplace or not, may host the web service application 210.

Turning now to the details of the manufacturing management service 102, the manufacturing management service 102 may include one or more service provider computers, perhaps arranged in a cluster of servers or as a server farm, and may host web service applications. These servers may be configured to host a website (or combination of websites) viewable on the user device 204 (e.g., via the web service application 210). The user 208 may access the website to view items that can be ordered from the manufacturing management service 102 (or an electronic marketplace associated with the manufacturing management service 102). These may be presentable to the user 208 via the web service applications.

The manufacturing management service 102 may include at least one memory 218 and one or more processing units (or processor(s)) 220. The processor 220 may be implemented as appropriate in hardware, computer-executable instructions, software, firmware, or combinations thereof. Computer-executable instruction, software, or firmware implementations of the processor 220 may include computer-executable or machine-executable instructions written in any suitable programming language to perform the various functions described. The memory 218 may include more than one memory and may be distributed throughout the manufacturing management service 102. The memory 218 may store program instructions that are loadable and executable on the processor(s) 220, as well as data generated during the execution of these programs. Depending on the configuration and type of memory including the manufacturing management service 102, the memory 218 may be volatile (such as random access memory (RAM)) and/or non-volatile (such as read-only memory (ROM), flash memory, or other memory). The memory 218 may include an operating system 222 and one or more application programs, modules, or services for implementing the techniques described herein including at least a manufacturing management engine 206. In some examples, the three-dimensional manufacturing apparatus 110 is configured to perform the techniques described herein with reference to the manufacturing management service 102, including the manufacturing management engine 206. For example, the three-dimensional manufacturing apparatus 110 may include a comparable engine to the manufacturing management engine 206. In some examples, the user device 204 may be configured to perform the techniques described herein with reference to the manufacturing management service 102, including the manufacturing management engine 206. For example, the user device 204 may include a comparable engine to the manufacturing management engine 206. In this example, the user 208 may use the user device 204 to generate the three-dimensional model 108 and may also use the user device 204 to generate the three-dimensional manufacturing instructions 112. The three-dimensional manufacturing instructions 112 may then be provided to the three-dimensional manufacturing apparatus 110 in order to produce the item 106. For example, the three-dimensional manufacturing instructions 112 may be saved to a disk and transferred via the disk to the three-dimensional manufacturing apparatus 110 or provided via a local or wide area network, or other connection.

The manufacturing management service 102 may also include additional storage 224, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 224, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the manufacturing management service 102, the user device 204, and/or the three-dimensional manufacturing apparatus 110.

The manufacturing management service 102 may also include input/output (I/O) device(s) and/or ports 226, such as for enabling connection with a keyboard, a mouse, a pen, a voice input device, a touch input device, a display, speakers, a printer, or other I/O device.

The manufacturing management service 102 may also include a user interface 228. The user interface 228 may be utilized by an operator or one of the users 208 to access portions of the manufacturing management service 102. In some examples, the user interface 228 may include a graphical user interface, web-based applications, programmatic interfaces such as application programming interfaces (APIs), or other user interface configurations. The manufacturing management service 102 may also include a data store 230. In some examples, the data store 230 may include one or more data stores, databases, data structures, or the like for storing and/or retaining information associated with the manufacturing management service 102. Thus, the data store 230 may include databases, such as a customer information database 232, a model database 234, and an identifier database 236.

The customer information database 232 may be used to retain information pertaining to customers of the manufacturing management service 102, such as the user 208. Such information may include, for example, customer account information (e.g., electronic profiles for individual users), demographic information for customers, payment instrument information for customers (e.g., credit card, debit cards, bank account information, and other similar payment processing instruments), account preferences for customers, shipping preferences for customers, purchase history of customers, and other similar information pertaining to a particular customer and sets of customers, of the manufacturing management service 102. In some examples, the information retained in the customer information database 232 may be shared with and/or received from the electronic marketplace.

The model database 234 may be used to retain three-dimensional models that have been developed by the users 208 and provided to the manufacturing management service 102 or developed in any other suitable manner (e.g., pulled from a database of publicly-available models). The model database 234 may be referenced when the manufacturing management engine 206 attempts to identify a particular three-dimensional item, or generate three-dimensional manufacturing instructions.

The identifier database 236 may be used to retain information that can be used to identify one or more three-dimensional items produced by the three-dimensional manufacturing apparatus 110. For example, within the identifier database 236 may be retained information describing details about a particular transaction for generating a three-dimensional item. The details may identify the designer, a file name of the item, special instructions for generation (e.g., design characteristics), the number of items to be produced, the class from which the unique identifier used to uniquely identify the item was selected, a location on the item (s) where the unique identifier(s) are located, numerical codes (e.g., a series of "1"s and "0" s) corresponding to the unique identifier(s), alphanumerical codes corresponding to the unique identifiers, or any other suitable information corresponding to the unique identifiers. In some examples, identifiable information may correspond to one or more existing identification methods (e.g., uniform product code (UPC), stock keeping unit (SKU), and the like). Classes of identifiable information may include, for example, integrated identifiers (e.g., identifiers that are integrated into a construction operation of a three-dimensional item during production of the three-dimensional item), attached identifiers (e.g., identifiers that are printed, embossed, etched, etc. to a piece of printed material that is attached to the three-dimensional item and which may be removable from the three-dimensional item), existing element-based identifiers (e.g., identifiers that are printed onto existing elements of the three-dimensional item), and modified element-based identifiers (e.g., identifiers that are produced by modifying the design of an existing element of the three-dimensional model).

Figure 3:
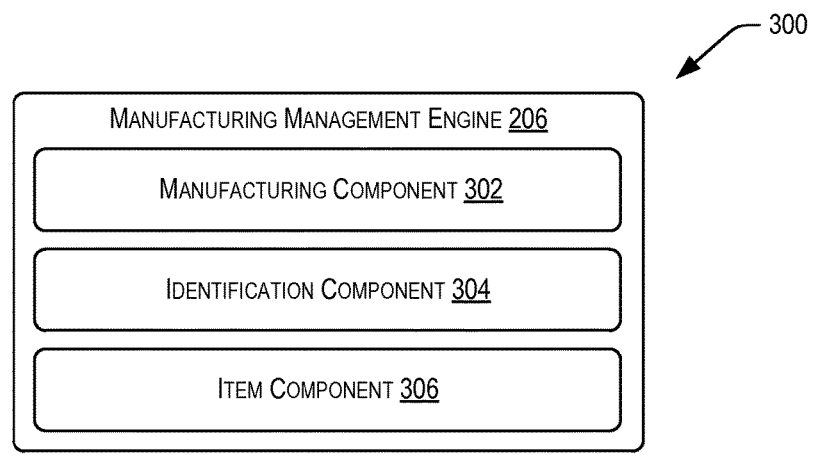
FIG. 3 is an example device for implementing techniques relating to generating instructions for producing three-dimensional items including identifiable information as described herein, according to at least one example.

FIG. 3 illustrates an example device 300 including the manufacturing management engine 206. The manufacturing management engine 206 may be configured to implement the function described herein with reference to the manufacturing management service 102. In particular, the manufacturing management engine 206 may be configured to manage one or more sub-modules, components, and/or services directed to examples disclosed herein. In some examples, the manufacturing management engine 206 may include a manufacturing component 302, an identification component 304, and an item component 306. While these modules and components are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein. Other modules, components, or engines may perform the same tasks as the manufacturing management engine 206 or other tasks and may be implemented in a similar or different fashion.

The manufacturing component 302 may be configured to process orders for three-dimensional items and generate three-dimensional manufacturing instructions for producing the three-dimensional items. In some examples, each order may include a three-dimensional model that corresponds to the three-dimensional item referenced in the order. In this example, the manufacturing component 302 may be configured to generate the three-dimensional manufacturing instructions based at least in part on the three-dimensional model. In some examples, the manufacturing component 302 is also configured to generate three-dimensional manufacturing instructions for generating identifiable information for a particular three-dimensional item. In some examples, orders for three-dimensional items are initially received by an electronic marketplace. An entity that manages the electronic marketplace may then coordinate production of the three-dimensional items by a manufacturing entity. The manufacturing entity may include a computing device that includes the manufacturing management engine 206 in order to generate three-dimensional manufacturing instructions for producing the three-dimensional items and their associated identifiable information. Thus, in some examples, an order for a particular three-dimensional item may prompt the generation of three-dimensional manufacturing instructions and production of the three-dimensional item.

The identification component 304 may be configured to identify three-dimensional items via their identifiable information. For example, after a three-dimensional item including identifiable information has been produced, the identification component 304 may be configured to receive optical scanning information (e.g., one or more images) from an optical scanner (e.g., a camera) and process the optical scanning information to identify the identifiable information. In some examples, this may include comparing the optical scanning information of a three-dimensional item with a three-dimensional model according to which the three-dimensional item was generated to identify similarities and/or differences between the two. This may be performed using any suitable object recognition algorithm, the results of which can be compared to the information of the three-dimensional model. In this example, visible characteristics identified from the three-dimensional item which are also present in the three-dimensional model may indicate a unique match. In this manner, the three-dimensional item is uniquely identified. In some examples, the identification component 304 functions to analyze optical scanning information to identify identifiable information that may be integrated into the three-dimensional item, attached to the three-dimensional item, printed onto the three-dimensional item, or included in any other suitable manner. In some examples, the identification component 304, whether within the manufacturing management engine 206 or otherwise, may be used to identify three-dimensional items that are produced using a print on demand service.

The item component 306 may be configured to monitor three-dimensional items after they have been produced using a three-dimensional printer and identified using the identification component 304. For example, in a batch printing operation, the three-dimensional printer may produce a plurality of different three-dimensional items using a plurality of different three-dimensional models. Each of the three-dimensional items may have its own unique identifier produced as described herein. The identification component 304 may be called up to identify each of the plurality of three-dimensional items. Thereafter, the item component 306 may be used to record the unique identifiers in association with the three-dimensional item in the data store 230. In some examples, the item component 306 may be used to track movements of the three-dimensional items within a manufacturing operation, while being shipped, in association with a quality control measure, and for any other purpose. In some examples, the item component 306 may be configured to provide an indication of a three-dimensional item and corresponding identifiable information to an inventory management service. The inventory management service may be configured to track movements of the three-dimensional item within a warehouse, along a shipping route, or in any other suitable environment by using the identifiable information. In some examples, the inventory management service may be associated with an entity that operates the manufacturing management service 102 and/or an entity that operations an electronic marketplace.

Figure 4:
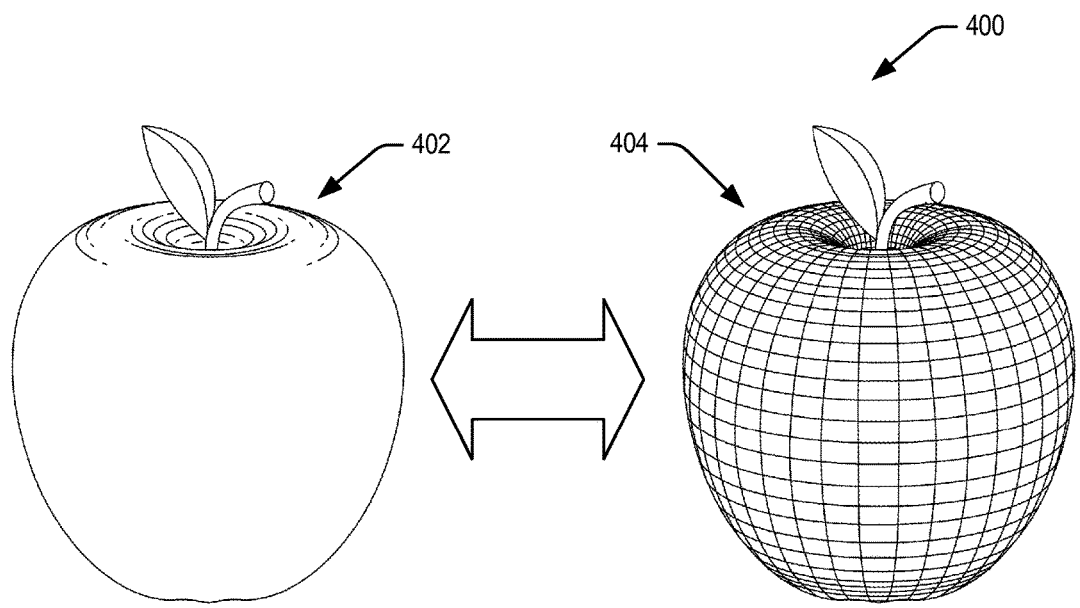
FIGS. 4-8 are examples of three-dimensional items produced using various techniques relating to generating instructions for producing three-dimensional items including identifiable information as described herein, according to at least some examples.

FIG. 4 illustrates an example schematic 400 including a three-dimensional item 402 and a three-dimensional model 404 according to which the three-dimensional item 402 may be compared in accordance with techniques described herein. The three-dimensional model 404 is an example of the three-dimensional model 108. The three-dimensional item 402 may have been previously produced in accordance with techniques described herein (e.g., from instructions generated based at least in part on the three-dimensional model 404). In some examples, the schematic 400 may be illustrative of an example method of identifying the three-dimensional item 402 based at least in part on the three-dimensional model 404. For example, in a batch three-dimensional printing operation, a three-dimensional printer is provided instructions to print a plurality of different three-dimensional items including the three-dimensional item 402 from a plurality of different three-dimensional models including the three-dimensional model 404. Each of the three-dimensional models may be associated with a customer order for its respective three-dimensional item. The batch three-dimensional printing operation may cause at least some of the plurality of three-dimensional items to be printed in parallel.

Conventionally, a human worker may collect the completed three-dimensional items and compare them to a set of images of what the completed three-dimensional items should look like in order to identify exactly which three-dimensional items have been completed. Once a particular three-dimensional item has been identified by the human worker, it can be processed and sent to a customer associated with the customer order. According to at least one example of the present disclosure, in order to more efficiently identify the completed three-dimensional items and to increase confidence that the correct three-dimensional item will be sent to the correct customer, the completed three-dimensional items may be compared to the three-dimensional models.

With reference again to the three-dimensional item 402 and the three-dimensional model 404, an optical scanner (e.g., a camera) may capture one or more images of the three-dimensional item 402 after it has been completed. The one or more images may be captured from different sides of the three-dimensional item 402 in order to generate a three-dimensional rendering of the three-dimensional item 402. Using computer vision techniques (e.g., object detection), certain characteristics of the three-dimensional rendering of the three-dimensional item 402 may be identified. For example, the location of certain points on the three-dimensional item in a three-dimensional space and the distance there between may be determined. In some examples, it may also be determined that the three-dimensional item 402 includes certain elements, e.g., a stem, a leaf, and a round shape. In some examples, it may also be determined that the three-dimensional item 402 is an apple. In any event, the characteristics of the three-dimensional item 402 represented by the three-dimensional rendering may be compared to the three-dimensional model 404 in order to identify the three-dimensional item 402 as the actual three-dimensional item that was anticipated to be generated from the three-dimensional model 404. Even if the different three-dimensional items of the plurality of three-dimensional items are similar, comparison to their respective three-dimensional models of the plurality of three-dimensional models may enable unique identification of each of the three-dimensional items and/or identification of other aspects of the three-dimensional items.

Figure 5:
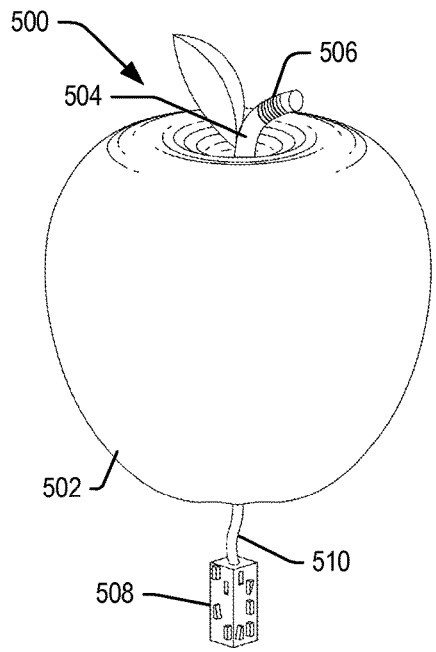

FIG. 5 illustrates an example three-dimensional item 500 and identifiers that can be produced by a three-dimensional printer from three-dimensional manufacturing instructions generated in accordance with techniques described herein. The three-dimensional item 500 (and the other three-dimensional items described herein) and its (their) associated identifiers may be read using any suitable combination of optical, electrical, and/or mechanical techniques. For example, such techniques include radiography, computer vision, machine vision, image processing, and any other suitable technique. The three-dimensional item 500 may be a version of an apple. The three-dimensional item 500 may include a body 502 and a stem 504. In some examples, the stem 504 may include an existing element-based identifier 506 printed onto the stem 504. In some examples, the existing element-based identifier 506 may be printed on any other element of the three-dimensional item 500 in a manner that does not add new elements to a designer's design of the three-dimensional item 500. For example, the existing element-based identifier 506 may be printed on the leaf of the apple or on the body 502. In some examples, the existing element-based identifier 506 may include any suitable combination of two-dimensional objects (e.g., lines, letters, numbers, shapes, or the like) arranged in a unique manner. In some examples, the existing element-based identifier 506 may be a unique arrangement of horizontal lines having varying thicknesses and spacing similar to a barcode. In some examples, the existing element-based identifier 506 may include any suitable combination of three-dimensional items (e.g., two-dimensional objects and colors or an arrangement of cuts, bumps, and/or slits (e.g., like a key)). In any event, the existing element-based identifier 506 may be printed by the three-dimensional printer using three-dimensional printing material. In some examples, the existing element-based identifier 506 may include a radio-frequency identification (RFID) tag. In some examples, at least a portion of the RFID tag may be printed using three-dimensional printing material, while the remaining portion may be embedded in the three-dimensional item 500 as part of the manufacturing process. For example, electrically-conductive three-dimensional printing material may be used to print an antenna portion of the RFID tag or other electrically-conductive portion. In some examples, the complete RFID tag may be embedded in the three-dimensional item 500. In some examples, the existing element-based identifier 506 (or any of the other identifiers described herein) may be printed in a manner such that the identifiable information remains after the three-dimensional item is finished (e.g., processed through a parts tumbler). In this manner, the three-dimensional items can be tracked after manufacturing. In some examples, the identifiers are printed in a manner such that the identifiers fall off, are removed, or polished off prior to being shipped to the customers. For example, the identifiers may be printed in a manner such that they are removed during a finishing process involving tumbling.

In some examples, the three-dimensional item 500 may include an attached identifier 508 attached to the body 502 via an attachment wire 510. In some examples, the attached identifier 508 is a three-dimensional identifier and includes a suitable combination of three-dimensional items (cuts, bumps, and/or slits) that can be read using a three-dimensional reading device. For example, the combination of the three-dimensional items may be unique in order to identify aspects of the three-dimensional item 500. In some examples, the attached identifier 508 and the attachment wire 510 may be printed by the three-dimensional printer at or around the same time that the three-dimensional item 500 is printed. The attachment wire 510 may be any suitable thickness, but, in some examples, may be around 0.3-5.0 millimeters in diameter. In some examples, the attached identifier 508 may be read by inserting the attached identifier 508 into the three-dimensional reading device. In this way, the attached identifier 508 may have characteristics similar to a key and the three-dimensional reading device may have characteristics similar to a tumbler lock. In some examples, the three-dimensional reading device may include a combination of mechanical, electrical, and optical components arranged in any suitable manner to read the attached identifier 508. In some examples, the attachment wire 510 corresponds to a sprue used during production of the three-dimensional item 500. Thus, the attached identifier 508 may be attached to the body 502 via a sprue. In some examples, the attachment wire 510 is selected to have an appropriate thickness such that it will naturally break during some part of the manufacturing process (e.g., during a finishing process). In some examples, a human or automated worker may remove the attached identifier 508 by breaking the attachment wire 510.

Figure 6:
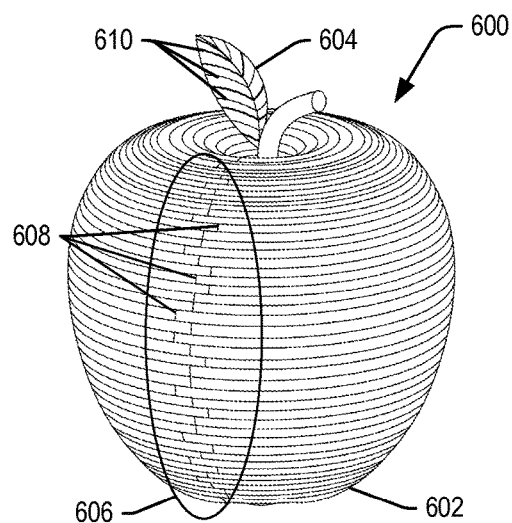

FIG. 6 illustrates an example three-dimensional item 600 and identifiers that can be produced by a three-dimensional printer from three-dimensional manufacturing instructions generated in accordance with techniques described herein. In some examples, at least a portion of the three-dimensional item 600 may be produced using a three-dimensional seam offset operation, as described herein. The three-dimensional item 600 may be a version of an apple and may therefore include a body 602 and a leaf 604. In FIG. 6, the three-dimensional item 600 is illustrated to emphasize the horizontal layers of three-dimensional printing material that make up the three-dimensional item 600. In this example, a seam 606 of the body 602 is highlighted within the oval. The seam 606 may include a plurality of starting and stopping locations 608 that extend from the bottom of the three-dimensional item 600 to the top of the three-dimensional item 600. The starting and stopping locations 608 are illustrated as vertical lines that extend between adjacent upper and lower horizontal lines. The horizontal lines correspond to the horizontal layers of three-dimensional printing material that have been extruded incrementally to produce the three-dimensional item 600. In some examples, an identifier may be integrated into the three-dimensional item 600 at the seam 606 as part of producing the three-dimensional item 600. This may be done by selectively determining where the starting and stopping locations 608 of an extrusion head of the three-dimensional printer will be in relation to each other. Conventionally, the three-dimensional printer (or other additive manufacturing apparatus) lays down thin layers of plastic by heating up printing material and laying the heated material down in a pattern that begins and ends at the same starting and stopping location (e.g., X1, Y1 at height Z1.) To create the next layer, the three-dimensional printer typically moves to X1, Y1, Z2 (i.e., same X, Y coordinates, but an increase in the Z axis) and follows the appropriate pattern (e.g., around the body 602 of the three-dimensional item 600). Thus, typically the seam of a conventionally-produced three-dimensional item will include starting and stopping locations that are immediately above earlier locations and immediately below later locations. In the illustrated example, however, not only is the Z coordinate increased, but adjustments are also made to the X and/or Y coordinates. These adjustments may cause each of the starting and stopping locations 608 to vary compared to earlier locations. This varying of the starting and stopping locations 608 can be selectively determined in order to create a pattern that can function as an identifier. For example, an offset of the starting and stopping locations 608 to the left may represent a "1" and an offset of the starting and stopping locations 608 to the right may represent a "0". Thus, the combination of any suitable number of starting and stopping locations 608 may create a series of horizontally offset starting and stopping locations that may create the unique code. In some examples, more complex patterns may be developed that include more than two corresponding representations. For example, instructions to generate a unique pattern corresponding to a decimal or hexadecimal system can be used.

In some examples, the leaf 604 may be constructed to include a modified element-based identifier 610. In this example, a three-dimensional design file corresponding to the three-dimensional item 600 may include the leaf 604 and one or more veins. In some examples, a designer may tag the leaf 604 as an existing element of the three-dimensional item 600 that may be modified during production. In some examples, based at least in part on this authorization, the veins of leaf 604 may be printed in a manner that modifies the original design of the leaf, but does so to construct the modified element-based identifier 610. In this example, because the veins have been arranged in a unique pattern, the unique pattern may be used as the modified element-based identifier 610.

Figure 7:
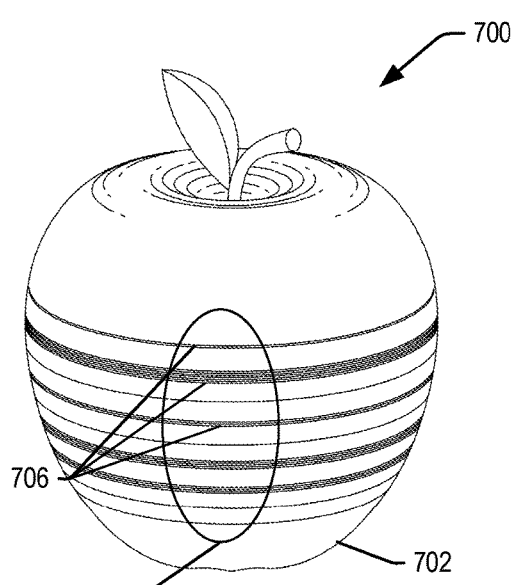

FIG. 7 illustrates an example three-dimensional item 700 and identifiers that can be produced by a three-dimensional printer from three-dimensional manufacturing instructions generated in accordance with techniques described herein. In some examples, at least a portion of the three-dimensional item 700 may be produced using a three-dimensional varied thickness operation and/or a three-dimensional infill operation, as described herein. The three-dimensional item 700 may be a version of an apple and may therefore include a body 702. In FIG. 7, the three-dimensional item 700 is illustrated to emphasize the thickness of the horizontal layers of three-dimensional printing material that make up the three-dimensional item 700. It is understood that only a portion of the horizontal layers are illustrated in FIG. 7. The techniques described herein may be applicable to all or substantially all of the layers of the three-dimensional item 700. FIG. 7 includes a window 704 that includes a portion of the body 702 and a plurality of horizontal layers 706. The window 704 is shown for illustrative purposes. As described herein, to produce the three-dimensional item 700 using a three-dimensional printer, the three-dimensional printer prints a first layer by following a pattern and at height Z1. Next, the three-dimensional printer moves up a particular distance (e.g., Z1+1) and prints a second layer substantially on top of the first layer. The combination of the movement in the vertical axis and the amount of pressure applied to the three-dimensional printing material as it is printed may determine a thickness of the second layer. In some examples, a feed rate of the printing material and temperature of the printing material may similarly influence the thickness. In most cases, the thickness may be uniform throughout a typical three-dimensional item. However, in the example illustrated by FIG. 7, the thickness of the horizontal layers 706 may be selectively determined in a manner that creates a unique pattern that uniquely identifies the three-dimensional item 700. For example, the horizontal layers 706 are shown as having varying thicknesses. As the thicknesses of the horizontal layers 706 are varied, the unique pattern can emerge. Like the example in FIG. 6, in this example, the horizontal layers 706 may be varied according to a binary pattern (e.g., two layer thicknesses) or according to any other suitable pattern (e.g., nine layer thicknesses or sixteen layer thicknesses) in order to produce an identifier. Thus, the combination of any suitable number of different thicknesses of any suitable number of layers, may create a series of horizontal layers of three-dimensional printing material that may create the unique pattern. In some examples, the varied thicknesses may be imperceptible to a human user.

Figure 8:
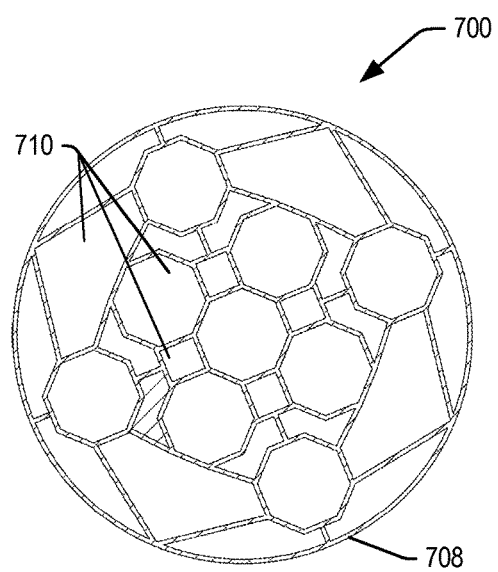

FIG. 8 illustrates a cross section 708 of the three-dimensional item 700 and an identifier that can be produced by a three-dimensional printer from three-dimensional manufacturing instructions generated in accordance with techniques described herein. The cross section 708 may include an infill pattern 710 including a combination of structures (e.g., honeycombs, squares, trapezoids, polygons, and the like). The infill pattern 710 may be determined in a manner that creates a unique pattern for the three-dimensional item 700. The unique pattern may be used as an identifier for identifying aspects of the three-dimensional item 700.

In some examples, the unique pattern may be determined in a manner that is considerate of strength and weight of the three-dimensional item 700. For example, typically, the fill of a three-dimensional item is selected in order to optimize strength and minimize weight. Thus, structures such as honeycombs may typically be used. In this example, however, the fill may be selected in a manner that not only optimizes strength and minimizes weight, but also creates the unique pattern. Thus, the requirements for strength and weight may be used as parameters in selecting which structures to use and according to which configuration. In some examples, the requirements for weight and strength may be provided to the manufacturing management service by the designer. In some examples, weight and strength requirements are considered by the manufacturing management service that generates the three-dimensional manufacturing instructions. In some examples, the structures are selected and their configuration determined without regard to the requirements for strength and/or weight. In either example, as part of generating the three-dimensional manufacturing instructions, the system may access a database of possible structures and determine a combination of the possible structures that would uniquely identify aspects of the three-dimensional item 700 and meet any other requirements.

Figure 9:
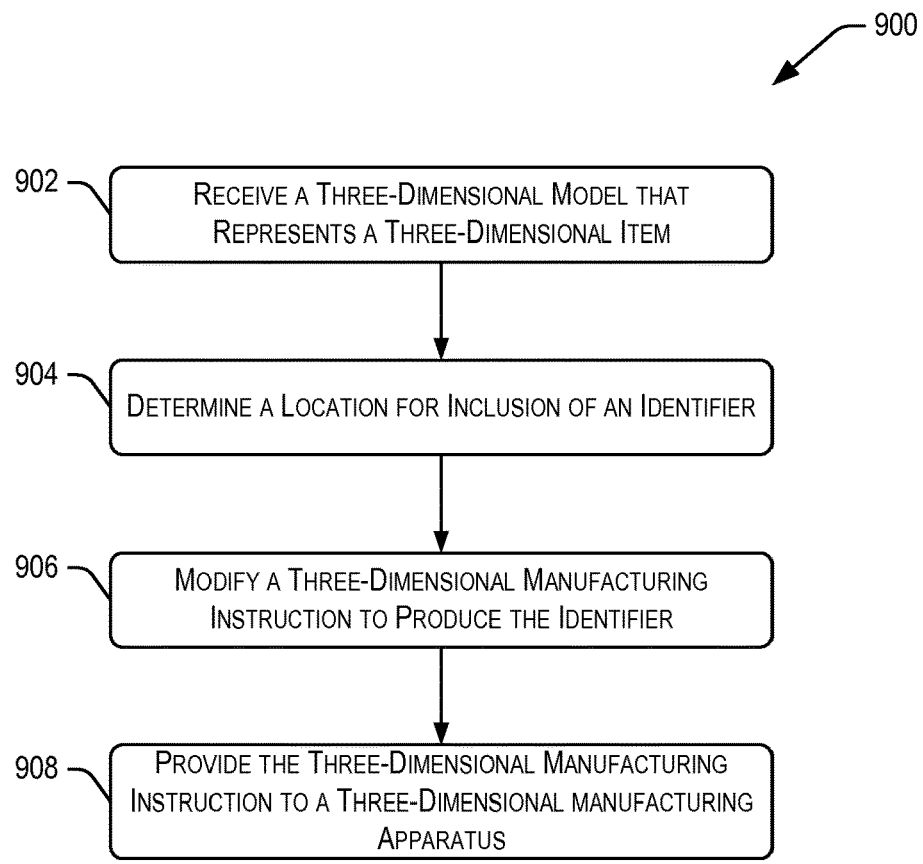
FIG. 9 is an example flow diagram for implementing techniques relating to generating instructions for producing three-dimensional items including identifiable information as described herein, according to at least one example.
Figure 10:
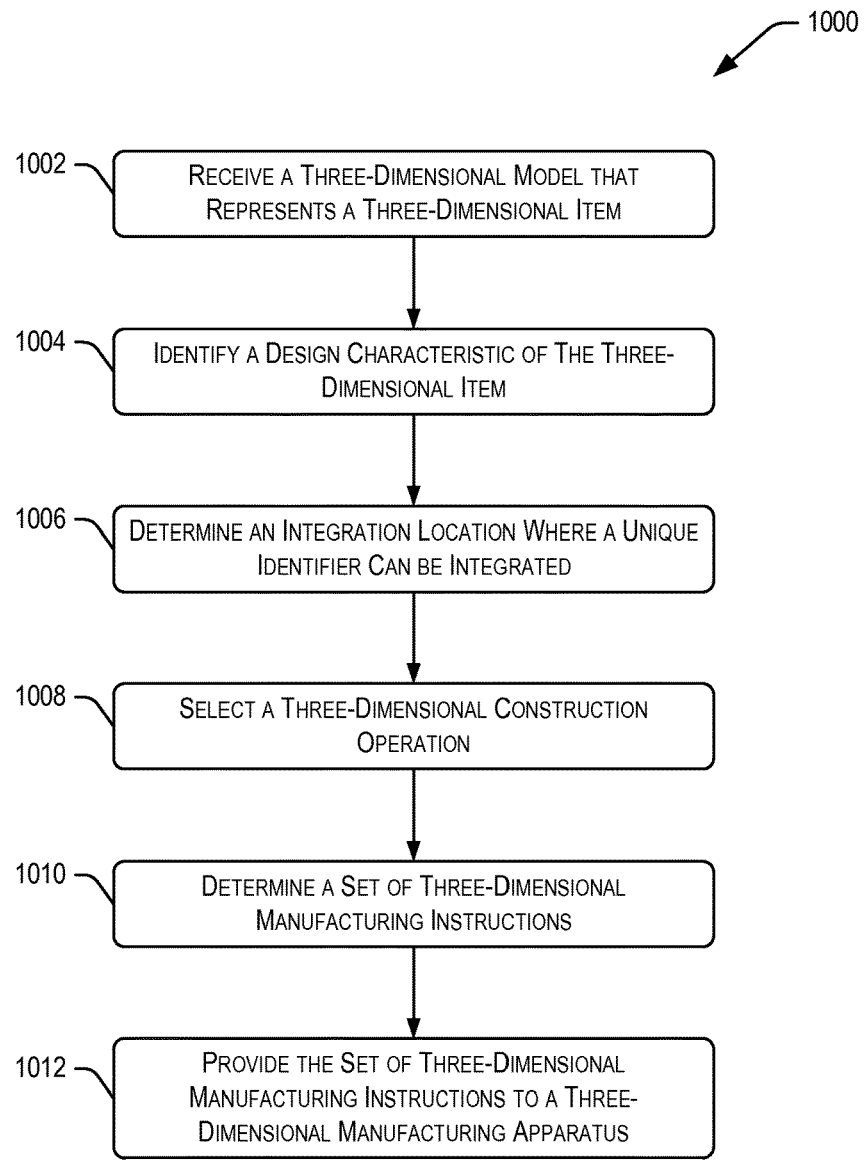
FIG. 10 is an example flow diagram for implementing techniques relating to generating instructions for producing three-dimensional items including identifiable information as described herein, according to at least one example.

FIGS. 9 and 10 illustrate example flow diagrams showing respective processes 900 and 1000 as described herein. These processes 900 and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 9 depicts the process 900 including example acts or techniques relating to generating instructions for producing three-dimensional items including identifiable information as described herein. The manufacturing management engine 206 (FIG. 2) may perform the process 900 of FIG. 9. The process 900 begins at 902 by receiving a three-dimensional model that represents a three-dimensional item. In some examples, receiving the three-dimensional model may be performed by the manufacturing component 302 (FIG. 3). Receiving the three-dimensional model may include receiving the model from a designer via a network. In some examples, the three-dimensional model is an electronic drawing file such a CAD file. The three-dimensional model may represent the three-dimensional item by including a representation of the three-dimensional item in electronic format.

At 904, the process 900 determines a location for inclusion of an identifier. In some examples, determining the location may be performed by the manufacturing component 302. Determining the location may include determining the location based at least in part on a design characteristic of the three-dimensional item. The design characteristic may include a strength characteristic, a finish characteristic, a weight characteristic, or an alteration allowance characteristic. In some examples, the designer may provide at least some of the characteristics. For example, the designer may designate that no alterations may be made to the design of the three-dimensional item (i.e., an alteration allowance characteristic that disallows alterations). In some examples, the design characteristic may be inherent to the three-dimensional model. For example, the design characteristics may be derived from the three-dimensional model to determine that the three-dimensional item is an elongated cylinder that is hollow and includes a closed bottom (e.g., in the shape of a vase). In this example, based at least in part on characteristics of the three-dimensional item, the process 900 may determine a suitable location for integration of the identifier. For example, because the vase has elongated and flat sides, it may be proper to integrate the identifier in a vertical seam of the vase or a series of horizontal lines. Because the vase is hollow, it may not be proper to integrate the identifier in the fill (because there will be no fill). The process 900 may also determine whether there are elements of the three-dimensional items on which the identifier could be printed. For example, a bottom portion of the vase may be suitable because it would not be seen by users and would not affect the design of the vase.

At 906, the process modifies a three-dimensional manufacturing instruction to produce the identifier. In some examples, modifying the three-dimensional instruction may be performed by the manufacturing component 302. Modifying the three-dimensional manufacturing instruction may include determining a set of three-dimensional manufacturing instructions including instructions to produce the identifier and to produce other portions of the three-dimensional item. In some examples, modifying the three-dimensional manufacturing instruction may include adjusting a previously-generated three-dimensional manufacturing instruction in a manner such that an identifier will be produced by the three-dimensional manufacturing apparatus when it executes the modified instruction. In some examples, the three-dimensional manufacturing instruction may instruct a three-dimensional manufacturing apparatus to produce layers of printing material having offset starting and stopping locations, produce layers of printing material having varied thicknesses, produce an infill pattern of the three-dimensional item having a unique pattern, produce the identifier on an existing element of the three-dimensional item, produce the identifier by modifying an existing element of the three-dimensional item, and/or produce the identifier by producing an identifier that is attached to the three-dimensional item.

At 908, the process 900 provides the three-dimensional manufacturing instruction to a three-dimensional manufacturing apparatus. In some examples, providing the three-dimensional manufacturing instruction is performed by the manufacturing component 302. The three-dimensional manufacturing apparatus may use the three-dimensional manufacturing instruction to produce the three-dimensional item. In some examples, the three dimensional item may be produced to include the identifier. In some examples, the three-dimensional manufacturing apparatus performs one or more operations on the instructions prior to executing them. For example, the three-dimensional manufacturing apparatus may convert the format of the instructions to a different format, may adjust the coordinate system, and the like.

FIG. 10 depicts the process 1000 including example acts or techniques relating to generating instructions for producing three-dimensional items including identifiable information as described herein. The manufacturing management engine 206 (FIG. 2) may perform the process 1000 of FIG. 10. The process 1000 begins at 1002 by receiving a three-dimensional model that represents a three-dimensional item. In some examples, receiving the three-dimensional model may be performed by the manufacturing component 302 (FIG. 3). In some examples, the three-dimensional model may be received as part of an order for the three-dimensional item via an electronic marketplace. In some examples, the three-dimensional model is provided to a manufacturing entity. In some examples, the manufacturing entity receives the three-dimensional model in response to an electronic marketplace receiving an order for the three-dimensional item. In some examples, the three dimensional model is provided to the manufacturing entity before an order is received.

At 1004, the process 1000 identifies a design characteristic of the three-dimensional item. In some examples, identifying the design characteristic may be performed by the manufacturing component 302. Identifying the design characteristic may include identifying the design characteristic from the three-dimensional model, receiving the design characteristic from the designer, or deriving the design characteristic in any other suitable manner. The design characteristic may indicate details about the design of the three-dimensional item and/or details about the desired finished condition of the three-dimensional item. In some examples, the design characteristic may correspond to an interior of the three-dimensional item and/or an exterior of the three-dimensional item.

At 1006, the process 1000 determines an integration location where a unique identifier can be integrated. In some examples, determining the integration location may be performed by the manufacturing component 302. Determining the integration location may include determining the integration location based at least in part on the design characteristic determined at 1004. In some examples, the integration location may be within the interior of the three-dimensional item or on the exterior of the three-dimensional item. In some examples, the determination of the integration location may consider more than one design characteristic and may include determining a location that is optimal and/or balances a variety of factors. For example, a designer may desire to minimize any noticeable effects from integration, while a manufacturing entity may want to maximize the ease of identifying the unique identifier. These and other factors may be considered in determining the integration location.

At 1008, the process 1000 selects a three-dimensional construction operation. In some examples, selecting the three-dimensional construction operation may be performed by the manufacturing component 302. Selecting the three-dimensional construction operation may include selecting from a set of construction operations including a three-dimensional seam offset operation, a three-dimensional varied thickness operation, and a three-dimensional infill operation. In some examples, each of the operations in the set may be distinct and capable of producing a unique pattern. The three-dimensional construction pattern may be selected based at least in part on the integration location. For example, if the integration location is an interior portion of the three-dimensional item, the process 1000 may select the three-dimensional infill operation. On the other hand, if the integration location is an exterior portion of the three-dimensional item, the process 1000 may determine which of the seam offset operation or the varied thickness operation would be desirable. In making this determination, the process 1000 may consider any parameters described herein. For example, a finishing parameter may indicate that the operation that would result in an identifier that is the least perceivable to the designer (or other human) be selected. In this example, a seam offset operation may be selected over a varied thickness operation. In some examples, selecting the three-dimensional construction operation may include selecting more than one operation.

At 1010, the process 1000 determines a set of three-dimensional manufacturing instructions. In some examples, determining the set may be performed by the manufacturing component 302. Determining the set of three-dimensional manufacturing instructions may include determining based at least in part on the three-dimensional model and the three-dimensional construction operation determined at 1008. In some examples, the set of three-dimensional manufacturing instructions may be machine-readable instructions for instructing a three-dimensional manufacturing apparatus to produce the three-dimensional item. In some examples, the set of three-dimensional manufacturing instructions may also include at least one instruction that is human-readable. The human-readable instruction may be used by a human operator as part of producing the three-dimensional item. The set of three-dimensional manufacturing instructions may include a first instruction to instruct the three-dimensional manufacturing apparatus to produce a portion of the three-dimensional item using a unique variation of the three-dimensional construction pattern that creates the unique identifier and integrates the unique identifier at the integration location. In some examples, the set of three-dimensional manufacturing instructions may include a second instruction to instruct the three-dimensional manufacturing apparatus to produce a different portion of the three-dimensional item. In some examples, the different portion includes a remaining portion of the three-dimensional item.

At 1012, the process 1000 provides the set of three-dimensional manufacturing instructions to the three-dimensional manufacturing apparatus. In some examples, providing the set of three-dimensional manufacturing instructions may be performed by the manufacturing component 302.

Figure 11:
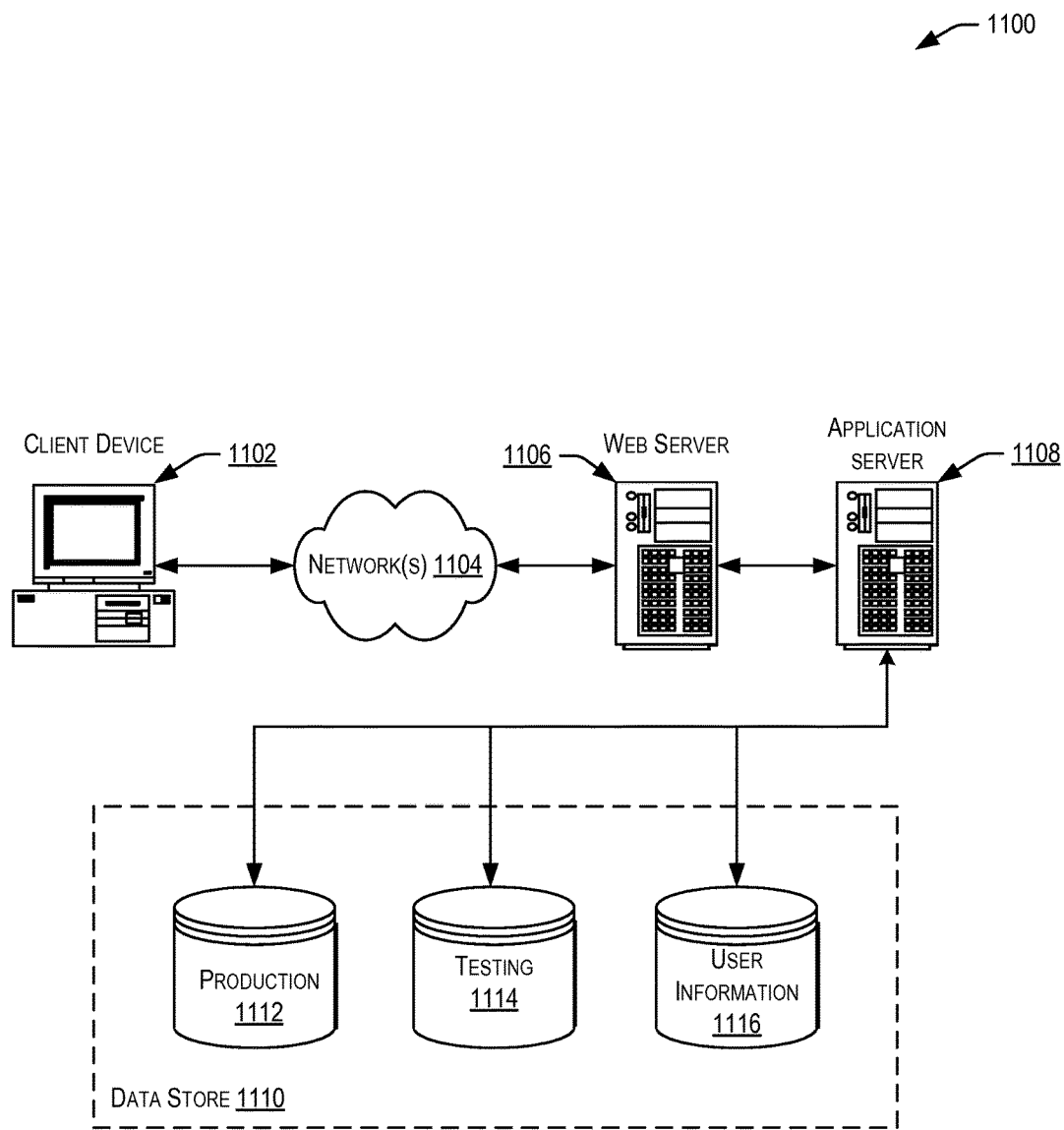
FIG. 11 is an example schematic environment for implementing techniques relating to generating instructions for producing three-dimensional items including identifiable information as described herein, according to at least one example.

FIG. 11 illustrates aspects of an example schematic environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any suitable device operable to send and receive requests, messages, or information over a suitable network 1104 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for accessing requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a three-dimensional model that represents a three-dimensional item;
   analyzing the three-dimensional model to identify a design characteristic of the three-dimensional item corresponding to an interior of the three-dimensional item or an exterior of the three-dimensional item;
   determining, based at least in part on the design characteristic, an integration location on the exterior of the three-dimensional item or within the interior of the three-dimensional item where a unique identifier can be integrated;
   selecting, based at least in part on the design characteristic, an identifier class from among a set of identifier classes;
   selecting, based at least in part on the integration location and the identifier class, a three-dimensional construction operation from a set of three-dimensional construction operations comprising at least one of a three-dimensional seam offset operation, a three-dimensional varied thickness operation, or a three-dimensional infill operation;
   determining, based at least in part on the three-dimensional model and the three-dimensional construction operation, a set of three-dimensional manufacturing instructions for producing the three-dimensional item, the set of three-dimensional manufacturing instructions comprising:
   a first three-dimensional manufacturing instruction to instruct a three-dimensional manufacturing apparatus to produce a portion of the three-dimensional item using a unique variation of the three-dimensional construction operation that creates the unique identifier and integrates the unique identifier at the integration location;
   providing the set of three-dimensional manufacturing instructions to the three-dimensional manufacturing apparatus; and
   causing the three-dimensional manufacturing apparatus to produce the three-dimensional item in accordance with the set of three-dimensional manufacturing instructions.

2. The computer-implemented method of claim 1, wherein the selected three-dimensional construction operation is the three-dimensional seam offset operation, and wherein the unique variation comprises a series of horizontally offset starting and stopping locations of an extrusion head of the three-dimensional manufacturing apparatus along a vertical seam of the portion of the three-dimensional item, the series of horizontally offset starting and stopping locations along the vertical seam creating the unique identifier.

3. The computer-implemented method of claim 1, wherein the selected three-dimensional construction operation is the three-dimensional varied thickness operation, and wherein the unique variation comprises a series of horizontal layers of three-dimensional printing material having varied thicknesses within the portion of the three-dimensional item, the series of horizontal layers creating the unique identifier.

4. The computer-implemented method of claim 1, wherein the selected three-dimensional construction operation is the three-dimensional infill operation, and wherein the unique variation comprises a unique infill pattern of three-dimensional printing material within the interior of the three-dimensional item, the unique infill pattern creating the unique identifier.

5. The computer-implemented method of claim 1, wherein the design characteristic is inherent to the three-dimensional model or received as a user-provided parameter.

6. The computer-implemented method of claim 1, wherein the set of identifier classes comprises two or more of an integrated identifier class, an attached identifier class, an existing-element identifier class, and a modified element-based identifier class.

7. A computer-implemented method, comprising:
   receiving a three-dimensional model that represents a three-dimensional item;
   analyzing the three-dimensional model to identify a design characteristic of the three-dimensional model;
   determining, based at least in part on the design characteristic of the three-dimensional item, a location with respect to the three-dimensional item for inclusion of an identifier;
   selecting, based at least in part on the design characteristic, an identifier class from among a set of identifier classes;
   modifying, based at least in part on the three-dimensional model and the identifier class, a three-dimensional manufacturing instruction to instruct a three-dimensional manufacturing apparatus to produce the identifier and include the identifier at the location;
   providing the three-dimensional manufacturing instruction to the three-dimensional manufacturing apparatus; and
   causing the three-dimensional manufacturing apparatus to produce the three-dimensional item in accordance with the three-dimensional manufacturing instruction.

8. The computer-implemented method of claim 7, wherein the design characteristic of the three-dimensional item comprises one or more of a strength characteristic of the three-dimensional item, a finish characteristic of the three-dimensional item, a weight characteristic of the three-dimensional item, or an alteration allowance characteristic of the three-dimensional item.

9. The computer-implemented method of claim 7, wherein the location comprises an element of the three-dimensional item represented in the three-dimensional model, and wherein the three-dimensional manufacturing instruction instructs the three-dimensional manufacturing apparatus to produce the identifier on the element.

10. The computer-implemented method of claim 7, wherein the identifier comprises an additional three-dimensional item that is not represented in the three-dimensional model, and wherein the location comprises an attachment location on an exterior of the three-dimensional item that connects the additional three-dimensional item to the three-dimensional item via a portion of printing material.

11. The computer-implemented method of claim 7, wherein the three-dimensional manufacturing instruction comprises a set of three-dimensional manufacturing instructions to instruct the three-dimensional manufacturing apparatus to:
produce a first layer of the three-dimensional item by extruding a first layer of printing material beginning and ending at a first location;
produce a second layer of the three-dimensional item by extruding a second layer of printing material beginning and ending at a second location that is horizontally offset from the first location; and
produce other layers of the three-dimensional item by extruding other layers of printing material beginning and ending at other locations that are horizontally offset from at least one of the first location or the second location, the identifier defined by a combination of the first location, the second location, and at least a portion of the other locations.

12. The computer-implemented method of claim 7, wherein the three-dimensional manufacturing instruction comprises a set of three-dimensional manufacturing instructions to instruct the three-dimensional manufacturing apparatus to:
produce a first layer of the three-dimensional item by extruding a first layer of printing material having a first vertical thickness;
produce a second layer of the three-dimensional item by extruding a second layer of printing material having a second vertical thickness distinct from the first vertical thickness; and
produce other layers of the three-dimensional item by extruding other layers of printing material having other vertical thicknesses that correspond to at least one of the first vertical thickness, the second vertical thickness, or a different vertical thickness, the identifier defined by a combination of the first vertical thickness, the second vertical thickness, and at least a portion of the other vertical thicknesses.

13. The computer-implemented method of claim 7, wherein the location comprises an interior of the three-dimensional item and the identifier comprises a pattern of shapes formed from printing material and disposed within the interior of the three-dimensional item.

14. The computer-implemented method of claim 7, wherein the identifier comprises a unique identifier that uniquely identifies the three-dimensional item at least compared to other three-dimensional items produced from the three-dimensional model.

15. The computer-implemented method of claim 7, further comprising providing the identifier to an inventory management service configured to track the three-dimensional item using the identifier.

16. The computer-implemented method of claim 7, further comprising, after the three-dimensional manufacturing apparatus produces the three-dimensional item in accordance with the three-dimensional manufacturing instruction, verifying, based at least in part on optical scanning information, that the three-dimensional item is identifiable using the identifier.

17. The computer-implemented method of claim 7, wherein the location comprises an exterior surface of the three-dimensional item, and wherein the exterior surface of the three-dimensional item comprises the identifier.

18. One or more non-transitory computer-readable media comprising computer-executable instructions that, when executed by one or more computer systems, cause the one or more computer systems to perform operations comprising:
receiving a three-dimensional model that represents a three-dimensional item;
analyzing the three-dimensional model to identify a design characteristic of the three-dimensional model;
determining, based at least in part on the design characteristic of the three-dimensional item, a location with respect to the three-dimensional item for inclusion of an identifier;
selecting, based at least in part on the design characteristic, an identifier class from among a set of identifier classes;
modifying, based at least in part on the three-dimensional model and the identifier class, a three-dimensional manufacturing instruction to instruct a three-dimensional manufacturing apparatus to produce the identifier and include the identifier at the location;
providing the three-dimensional manufacturing instruction to the three-dimensional manufacturing apparatus; and
causing the three-dimensional manufacturing apparatus to produce the three-dimensional item in accordance with the three-dimensional manufacturing instruction.

19. The one or more non-transitory computer-readable media of claim 18, wherein the design characteristic of the three-dimensional item comprises one or more of a strength characteristic of the three-dimensional item, a finish characteristic of the three-dimensional item, a weight characteristic of the three-dimensional item, or an alteration allowance characteristic of the three-dimensional item.

20. The one or more non-transitory computer-readable media of claim 18, wherein the three-dimensional manufacturing instruction comprises a set of three-dimensional manufacturing instructions to instruct the three-dimensional manufacturing apparatus to:
produce a first layer of the three-dimensional item by extruding a first layer of printing material beginning and ending at a first location;
produce a second layer of the three-dimensional item by extruding a second layer of printing material beginning and ending at a second location that is horizontally offset from the first location; and
produce other layers of the three-dimensional item by extruding other layers of printing material beginning and ending at other locations that are horizontally offset from at least one of the first location or the second location, the identifier defined by a combination of the first location, the second location, and at least a portion of the other locations.

* * * * *